D. J. HIGGINBOTHAM.
NUT LOCK.
APPLICATION FILED AUG. 30, 1907.
904,956.
Patented Nov. 24, 1908.
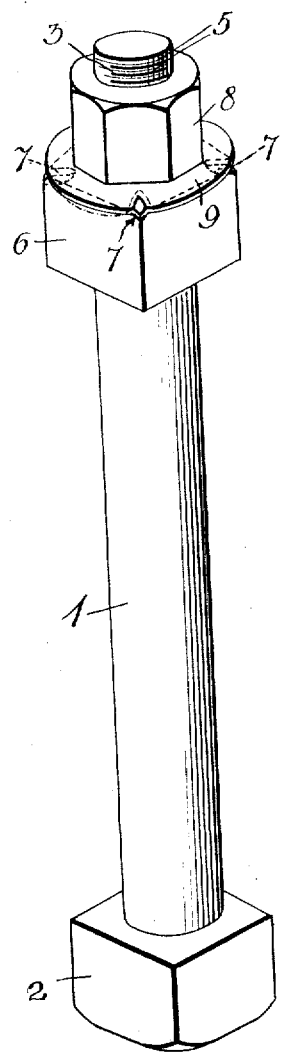
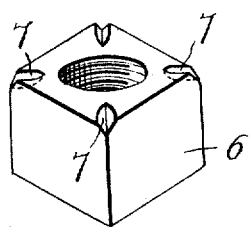
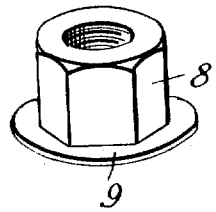
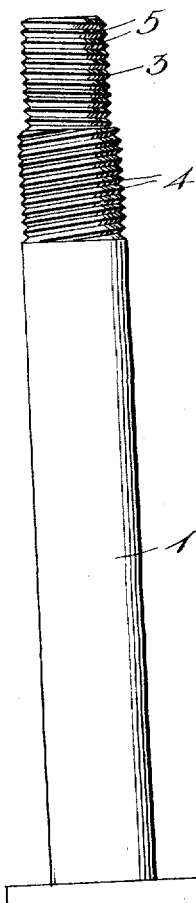
Witnesses
C. H. Griesbauer
Inventor
Don J. Higginbotham
by H. B. Willson & Co.
Attorneys

UNITED STATES PATENT OFFICE.

DON J. HIGGINBOTHAM, OF RIALTO, FLORIDA.

NUT-LOCK.

No. 904,956.　　　Specification of Letters Patent.　　　Patented Nov. 24, 1908.

Application filed August 30, 1907. Serial No. 390,704.

*To all whom it may concern:*

Be it known that I, DON J. HIGGINBOTHAM, a citizen of the United States, residing at Rialto, in the county of Lee and State of Florida, have invented certain new and useful Improvements in Nut-Locks; and I do declare the following to be a full, clear, and exact description of the invention, such as will enable others skilled in the art to which it appertains to make and use the same.

My invention has relation to improvements in nut locks, and it consists in the construction and arrangement of parts as will be hereinafter described and particularly pointed out in the claim.

In the accompanying drawings, Figure 1 is a perspective view of a bolt showing the application of the invention thereto; Fig. 2 is a side view of the bolt, with the nuts removed; Fig. 3 is a perspective view of the inner locking nut; and Fig. 4 is a similar view of the flanged outer nut.

Referring more particularly to the drawings, 1 denotes the bolt, which is provided on one end with a head, 2, and on its opposite end with a reduced extension, 3. The end of the bolt, adjacent to the extension, 3, is provided with a series of right-hand threads, 4, while the extension, 3, is provided with left-hand threads, 5.

Adapted to be screwed onto the right-hand threaded portion of the nut and against the object to which the bolt is applied, is an inner right-hand threaded nut, 6, in the outer side or face of which are formed diagonally arranged V-shaped notches or recesses, 7. On the extension, 3, is adapted to be screwed a left-hand threaded outer nut, 8, on the inner end of which is formed a thin, radially projecting flange, 9, which, when the nut 8 is screwed inwardly, is adapted to engage the outer side of the nut, 6, as shown. After the nuts have thus been screwed up into engagement, the flange, 9, is dented or bent into engagement with one of the notches, 7, by means of a punch or other suitable instrument, thereby securely locking the two nuts together against casual rotation. The dented portion of the flange 9, while being sufficient to hold the nuts against casual rotation and thereby locking the same in place upon the bolt, will not prevent the outer nut from being screwed off the bolt and out of engagement with the nut, 6, by means of a wrench or other suitable instrument, the construction thus providing a nut lock which may be released for the removal of the nuts when desired. Should a more secure or firmer lock be desired, the projecting edges of the flange, 9, may be upset and hammered down against one or more sides of the nut, as shown in dotted lines in Fig. 1 of the drawings.

Having thus fully described my invention, what I claim as new, and desire to secure by Letters-Patent, is:

A nut lock comprising a bolt with a screw-threaded end constructed of two different diameters, the larger diameter of which is provided with right hand screw threads, the smaller diameter having left hand screw threads, a nut on the larger diameter of threads having notches struck from the four corners of its outer face, a supplementary nut on the smaller diameter of threads having formed on its inner face a thin flange which extends outwardly therefrom, said flange adapted to contact with the outer face of the first mentioned nut and having a portion of its marginal edge forced into one or more of said notches, and said marginal edge of said flange adapted to be bent against the sides of the said first mentioned nut between the notches of the same, substantially as specified.

In testimony whereof I have hereunto set my hand in presence of two subscribing witnesses.

DON J. HIGGINBOTHAM.

Witnesses:
　JAS. T. MITCHELL,
　W. T. DODD.